United States Patent
Granger

(10) Patent No.: US 12,320,337 B2
(45) Date of Patent: Jun. 3, 2025

(54) VERSATILE SYSTEM EQUIPPED WITH A PAIR OF MECHANISMS WITH ECCENTRIC ELEMENTS CAPABLE OF MOVING IN ROTATION

(71) Applicant: Maurice Granger, Albufera (PT)

(72) Inventor: Maurice Granger, Albufera (PT)

( * ) Notice: Subject to any disclaimer, the term of this patent is extended or adjusted under 35 U.S.C. 154(b) by 127 days.

(21) Appl. No.: 18/339,633

(22) Filed: Jun. 22, 2023

(65) Prior Publication Data

US 2023/0417226 A1 Dec. 28, 2023

(30) Foreign Application Priority Data

Jun. 23, 2022 (FR) .................................. 2206237

(51) Int. Cl.
*F03G 3/00* (2006.01)
*F03G 7/10* (2006.01)
*H02K 7/02* (2006.01)

(52) U.S. Cl.
CPC ............... *F03G 3/091* (2021.08); *H02K 7/02* (2013.01); *F03G 7/10* (2013.01)

(58) Field of Classification Search
CPC . F03G 3/08; F03G 3/091; F03G 3/094; F03G 7/08; F03G 7/10; H02K 7/02
See application file for complete search history.

(56) References Cited

U.S. PATENT DOCUMENTS 4,712,439 A * 12/1987 North .................. F03G 3/00
74/61
5,150,626 A 9/1992 Navarro et al.

FOREIGN PATENT DOCUMENTS

| BE | 881656 A | * | 5/1980 | ............... F03G 3/00 |
| DE | 10143280 A1 | * | 3/2003 | ............... F02C 6/14 |
| GB | 232639 A | * | 10/1926 | |
| TW | 202111207 A | | 3/2021 | |
| WO | 2017064379 A1 | | 4/2017 | |
| WO | 2018069586 A1 | | 4/2018 | |

OTHER PUBLICATIONS

Search Report issued in French Patent Application No. 2206237 dated Dec. 20, 2022.

* cited by examiner

*Primary Examiner* — Phillip A Johnson
(74) *Attorney, Agent, or Firm* — McDonald Hopkins LLC

(57) ABSTRACT

A system includes two mechanisms each including a first support shaft equipped with a toothed wheel and with an element that is eccentric relative to the axis of rotation of the support shaft, and a second support shaft equipped with a toothed wheel and with an element that is eccentric relative to the axis of rotation of the support shaft. The eccentric elements of at least one mechanism are disposed at least partially in a plane of rotation perpendicular to the associated support shafts and, when the system is in operation, positions of the eccentric elements of one mechanism are constantly diametrically opposed to positions of the eccentric elements of the other mechanism.

8 Claims, 10 Drawing Sheets

A-A

VERSATILE SYSTEM EQUIPPED WITH A PAIR OF MECHANISMS WITH ECCENTRIC ELEMENTS CAPABLE OF MOVING IN ROTATION

1. TECHNICAL FIELD

The field of the invention is that of systems for transmitting mechanical energy for all conceivable applications.

More specifically, the present invention relates to such systems for exploiting, in various ways, the mechanical energy accumulated in eccentric elements capable of moving in rotation.

The present invention relates in particular, but not exclusively, to the issues of accumulating and delivering mechanical energy, and of converting it into electrical energy. Other applications, as an oscillating system mounted on a dedicated structure, such as a screen or a rammer for example, can also be envisaged.

2. PRIOR ART

Numerous motion transmission mechanisms exist in the mechanical field, such as planetary gears or crankshafts, suitable for equipping machines for transmitting energy or for any other application. However, the efficiencies obtained with known mechanisms are not entirely satisfactory.

The Applicant has developed several energy transmission mechanisms, such as the balanced mechanism described in the international patent application WO2017064379 and the mechanism with simultaneous cross centrifugal forces described in the international patent application WO2018069586, in order to overcome this problem. However, structural complexity forms a major drawback of the mechanisms described in these applications. This structural complexity has a number of adverse and undesirable effects on the mechanism itself, for example in terms of efficiency, overall dimensions and/or reliability, and on the users thereof, in particular in terms of user experience, maintenance and/or safety.

There is thus a need for a new energy transmission technique that does not have some or all of these adverse and undesirable effects. In particular, there is a need for a system that enables mechanical energy to be accumulated and delivered in a simple, efficient and reliable way. There is also a need for such a technique to be versatile, or to be easily modulated to become so, in order to adapt to the various applications envisaged and/or situations encountered. There is also a need to provide a simple manufacturing, assembly and/or maintenance technique at low cost.

3. DISCLOSURE OF THE INVENTION

The proposed technique relates to a system comprising a frame supporting:
- at least one pair of mechanisms, each comprising:
  - a first support shaft capable of moving in rotation about an axis, equipped with a first toothed wheel and with a first element that is eccentric relative to the axis of said first support shaft, and
  - a second support shaft capable of moving in rotation about an axis, equipped with a second toothed wheel and with a second element that is eccentric relative to the axis of said second support shaft,
- a main shaft capable of moving in rotation about an axis, equipped with at least a main toothed wheel cooperating with said first and second toothed wheels so as to link the rotation of the main shaft with the rotation of the first and second support shafts of said mechanisms, and vice-versa, and
- a rotation driving means coupled to said main shaft so as to rotate same.

According to the invention, said first and second eccentric elements of at least one of said mechanisms are disposed at least partially in a plane of rotation perpendicular to said associated first and second support shafts and, when said system is in operation, positions of said first and second eccentric elements of one of said mechanisms are constantly diametrically opposed to positions of said first and second eccentric elements of the other mechanism.

The system thus has a simple structure (eliminating the need for a rocker arm, connecting rods and/or a counterweight, for example), enabling it to be used in a variety of applications. In the international patent document WO2018/069586, a weighted rocker arm must be used to dampen the oscillations caused by cross centrifugation of the masses. For example, when the eccentric elements are identical, the system of the present invention is balanced. This makes it possible to apply high angular velocities to the main shaft of such a balanced system, and therefore to accumulate a significant amount of kinetic energy. According to another example, when the eccentric elements are different, the system oscillates periodically. Thus, by attaching such an oscillating system to a suitable structure, it can be used, for example, as a mixer or a compacting device.

According to one specific feature, the system further comprises transmission means connecting said main toothed wheel to said first and second toothed wheels so as to link the rotation of the main shaft to the rotation of the support shafts, and vice-versa.

In particular, such transmission means allow the support shafts to be spaced apart from the main shaft, and thus the associated toothed wheels. Eccentric elements with large dimensions (and thus large masses) can thus be implemented in the system. When the system is in operation, this results in the accumulation and delivery of a significant amount of mechanical energy.

According to one specific aspect, said transmission means comprise at least one intermediate toothed wheel carried by an intermediate shaft, disposed between said main toothed wheel and said first and second toothed wheels.

The implementation of one or more intermediate toothed wheels is a simple and robust solution for efficiently transmitting the rotary motions of the shafts.

According to another specific feature, each of said first and second eccentric elements is formed by at least one body having a ring for connection to said associated support shaft.

Such a configuration in particular allows the system to be modulated, by adding or removing masses, depending on the desired use.

According to another specific feature, said first and second eccentric elements are rigidly connected to said first and second toothed wheels respectively.

Such a rigid connection reinforces the mechanical strength of the eccentric elements in the system, and thus guarantees the operation and robustness thereof. Preferably, the rigid connection is made by removable means, such as a fastening screw and nut, for example. This in particular simplifies system assembly and maintenance.

Alternatively, said first and second eccentric elements and said first and second toothed wheels respectively are made in one piece.

Such an arrangement in particular reduces the overall dimensions of the eccentric element and ensures that it is held in place on the associated toothed wheel.

According to another specific feature, each first and second eccentric element takes the shape of a portion of a cylinder, preferably the shape of a half-cylinder.

According to another specific feature, the system comprises at least one coupling device, said coupling device connecting said drive means to said main shaft.

Such a coupling device allows the shaft of the motor to be connected to/separated from the main shaft, as required, in order to connect or disconnect the rotary drive.

According to another specific feature, said first and second eccentric elements of said mechanisms have the same mass and the same dimensions, and said system further comprises at least one energy harvesting device coupled to said main shaft of one of said mechanisms, said energy harvesting device being configured to convert mechanical energy accumulated in said eccentric elements into electrical energy.

Such a configuration allows a balanced system to be defined, i.e. one that generates little or no oscillation when in operation. Such a configuration in particular allows an efficient energy accumulation and delivery system to be defined.

According to another specific feature, said first and second eccentric elements of said mechanisms have different masses.

When the diametric opposition of the masses is constant, such a configuration in particular allows an oscillating system as presented hereinabove to be formed and, when the diametric opposition of the masses is periodic, it allows the oscillations formed to be increased.

4. PRESENTATION OF THE FIGURES

Other aims, features and advantages of the invention will be better understood upon reading the following description, which is given as a rough guide and in no way as a limiting guide, with reference to the accompanying figures, in which:

FIG. 1 diagrammatically shows a top view of an example of a system, according to a first embodiment of the invention, comprising a pair of mechanisms coupled in parallel;

Figure 5:
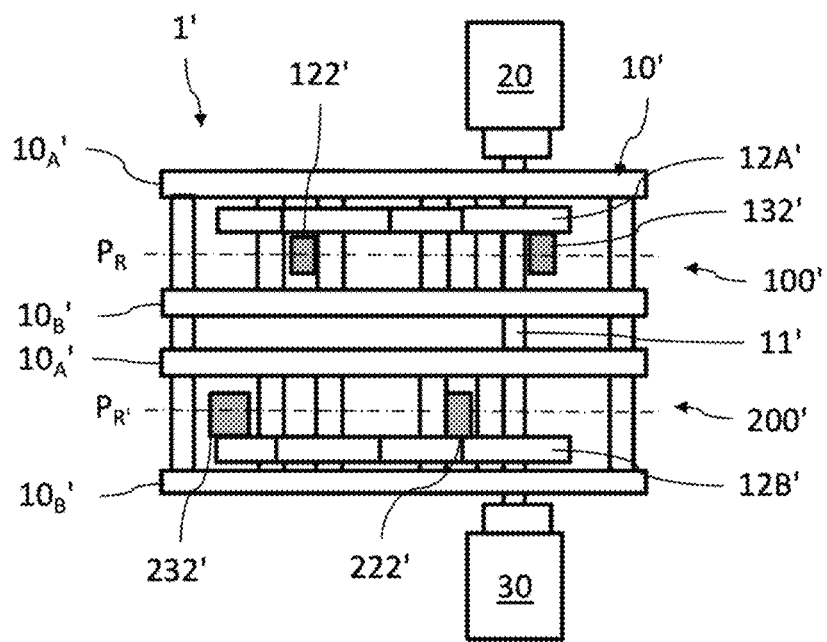
Figure 6A:
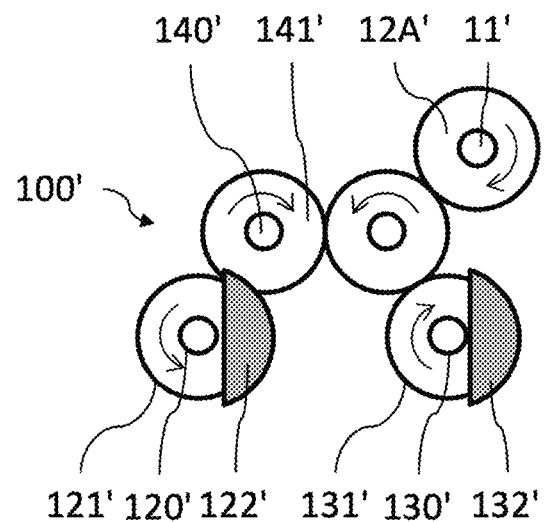
Figure 6B:
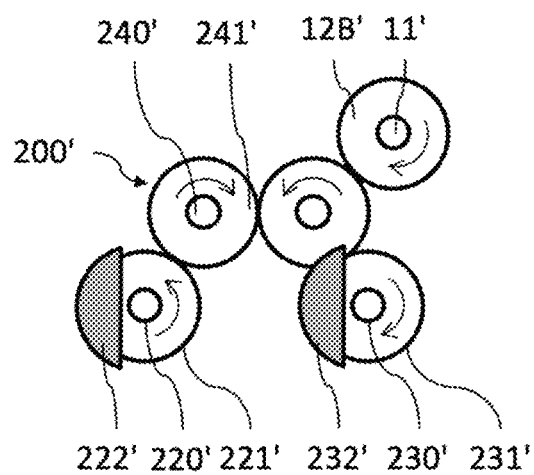
Figure 9:
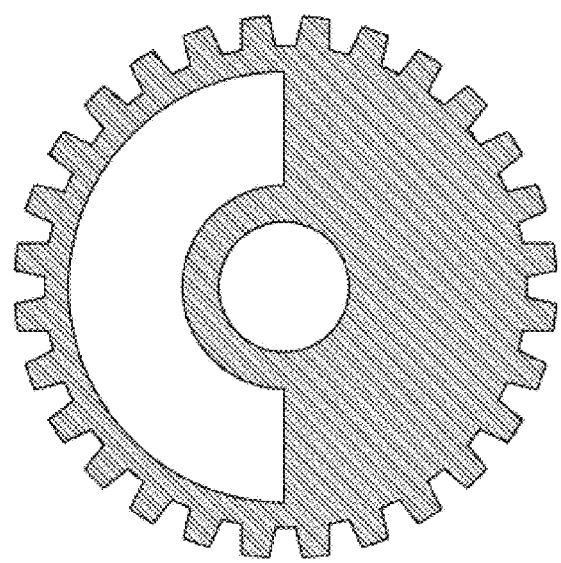

FIG. 5 diagrammatically shows a top view of an example of a system, according to a second embodiment of the invention, comprising a pair of mechanisms coupled in series;

FIGS. 6A and 6B illustrate two simplified views associated with each mechanism, of a positioning of the eccentric elements of the system shown in FIG. 5 and the displacement thereof when the system is in operation;

FIGS. 7A, 7B, 7C and 7D illustrate different simplified views of the displacement of the eccentric elements of a system according to a third embodiment of the invention;

FIGS. 8A, 8B, 8C and 8D illustrate different simplified views of the displacement of the eccentric elements of a system according to a fourth embodiment of the invention; and FIG. 9 illustrates another structural example of an eccentric element, integrated into a toothed wheel.

5. DETAILED DESCRIPTION OF THE EMBODIMENTS OF THE INVENTION

5.1. General Principle

At the cost of an innovative approach and non-obvious adaptations to the mechanisms of the prior art, the Applicant has determined that a specific configuration of certain components of the system, which configuration is described in detail hereinbelow, would dispense with the need to use certain other components, while guaranteeing that the system accumulates mechanical energy efficiently.

The general principle of the invention is based on the implementation of a system having at least one pair of coupled mechanisms, each comprising at least two support shafts respectively equipped with an eccentric element, in a specific configuration according to which the eccentric elements of at least one of the mechanisms are disposed at least partially in a plane of rotation perpendicular to the associated support shafts and, when the system is in operation, positions of the eccentric elements of one of the mechanisms are constantly diametrically opposed to positions of the eccentric elements of the other mechanism.

Among other things, such an ingenious configuration eliminates the need for eccentric elements to temporarily cross/overlap, and thus eliminates the need to implement a device to dampen the oscillations generated by these overlaps. In addition to this structural simplification, this configuration allows the mechanical energy accumulated in the mechanisms to be made use of in a variety of ways, i.e. in the form of electrical energy when the system is balanced (identical masses) or in the form of oscillatory energy when the system is unstable (different masses) for example.

5.2. Description of the Embodiments

Various embodiments of the proposed technique are illustrated hereinbelow, by way of simple illustration through non-limiting examples, with reference to FIG. 1 to 8D, which refer directly or indirectly to systems that deliver, in the form of electrical energy, the mechanical energy accumulated in each of the eccentric elements.

However, as will become apparent hereinbelow, the proposed technique is not limited to this application and can, subject to adapting the shapes, dimensions and/or masses of certain components of the system, suit other applications making use of the mechanical energy accumulated in the eccentric elements of the system.

The same elements are denoted hereinbelow by the same reference numerals in the different figures. To ease the understanding of the invention, the toothed wheels in certain figures have been shown by way of non-serrated circles.

FIG. 1 to 4D show an example of an energy accumulation and delivery system according to a first embodiment of the invention.

The structural aspects of such a system are firstly described with reference to FIGS. 1, 2 and 3.

The system 1 comprises a frame 10 supporting a main shaft 11, a pair of mechanisms 100, 200, a means 20 for rotating the mechanisms 100, 200 and a device 30 for harvesting energy from the mechanisms 100, 200.

The main shaft 11, which is capable of moving in rotation about an axis $A_{11}$, is equipped with a main toothed wheel 12.

The frame 10, which is intended to be rigidly connected to the ground, comprises two structures $10_A$, $10_B$, disposed opposite one another, between which the two mechanisms 100, 200 and the main toothed wheel 12 are disposed. Such an arrangement in particular contributes to increasing the stability of the system 1.

Each mechanism 100, 200 comprises a plurality of shafts parallel to one another, i.e. a first support shaft 120, 220 and a second support shaft 130, 230 respectively, rotatably mounted on the frame 10.

The first support shaft 120, 220, which is capable of moving in rotation about an axis $A_{120}$, $A_{220}$, is equipped with a first toothed wheel 121, 221 to which is rigidly connected a first element 122, 222 that is eccentric relative to the axis $A_{120}$, $A_{220}$. Similarly, the second support shaft 130, 230, which is capable of moving in rotation about an axis $A_{130}$, $A_{230}$, is equipped with a second toothed wheel 131, 231 to which is rigidly connected a second element 132, 232 that is eccentric relative to the axis $A_{130}$, $A_{230}$.

The first and second eccentric elements 122, 132, 222, 232 of the mechanisms 100, 200 are identical and are rigidly connected, by appropriate fastening means, to the associated first and second toothed wheels 121, 131, 221, 231. Each toothed wheel thus has a part that is weighed down by the associated eccentric element.

Each mechanism 100, 200 further comprises transmission means 141, 241 connecting the main toothed wheel 12 to the first and second toothed wheels 121, 131, 221, 231 so as to link the rotation of the main shaft 11 to the rotation of the support shafts 120, 130, 220, 230, and vice-versa.

In this embodiment, the mechanisms 100, 200 are assembled in parallel and symmetrically. The centre of gravity, shown by a cross X, of such an assembly (pair of mechanisms) thus lies in the plane of symmetry $P_S$ passing through the axis $A_{11}$ of rotation of the main shaft 11.

Such an arrangement of the mechanisms 100, 200 allows the first and second eccentric elements 122, 132 of one of the mechanisms, referred to as the first mechanism 100, to be disposed at least partially in the plane of rotation $P_R$ of the first and second eccentric elements 222, 232 of the other mechanism, referred to as the second mechanism 200. In other words, in accordance with a first aspect of the invention, the first and second eccentric elements 122, 132, 222, 232 of at least one of the mechanisms 100, 200 are disposed at least partially in a plane of rotation $P_R$ perpendicular to the associated first and second support shafts 120, 130.

In order to enable the system 1 with such a disposition to operate, the first and second eccentric elements 122, 132, 222, 232 are dimensioned so that they can move towards and/or away from one another, and thus from the centre of gravity, without colliding.

Furthermore, the system 1 has a specific arrangement according to which:
the first and second eccentric elements 122, 132 of the first mechanism 100 are oriented in a first common direction opposite a second common direction of the first and second eccentric elements 222, 232 of the second mechanism 200, and
the transmission means of each mechanism 100, 200 are arranged so as to allow for synchronised counter-rotation of the first and second eccentric elements 122, 132, 222, 232.

This specific arrangement allows, when the system 1 is in operation, the first and second eccentric elements 122, 132 of the first mechanism 100 to be in positions that are constantly diametrically opposed to those of the first and second eccentric elements 222, 232 of the second mechanism 200, in accordance with the second aspect of the invention. This will become more apparent with reference to FIG. 4A to 4D which are described hereinbelow.

Figure 1:
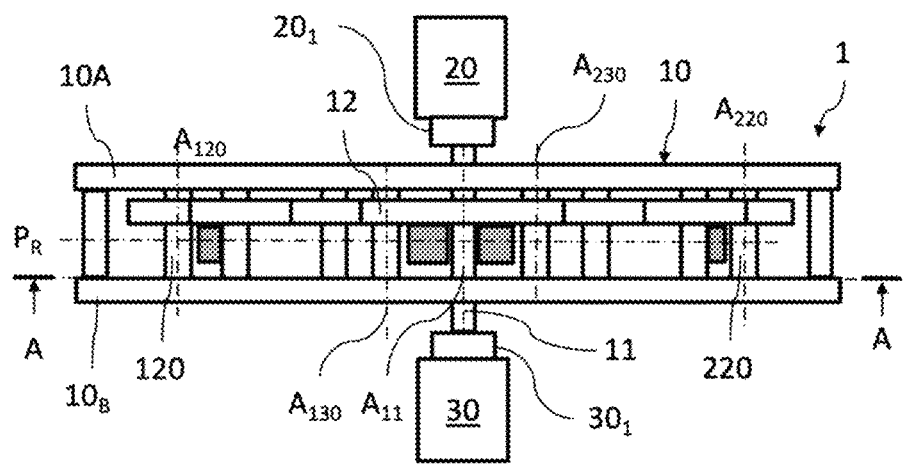
Figure 2:
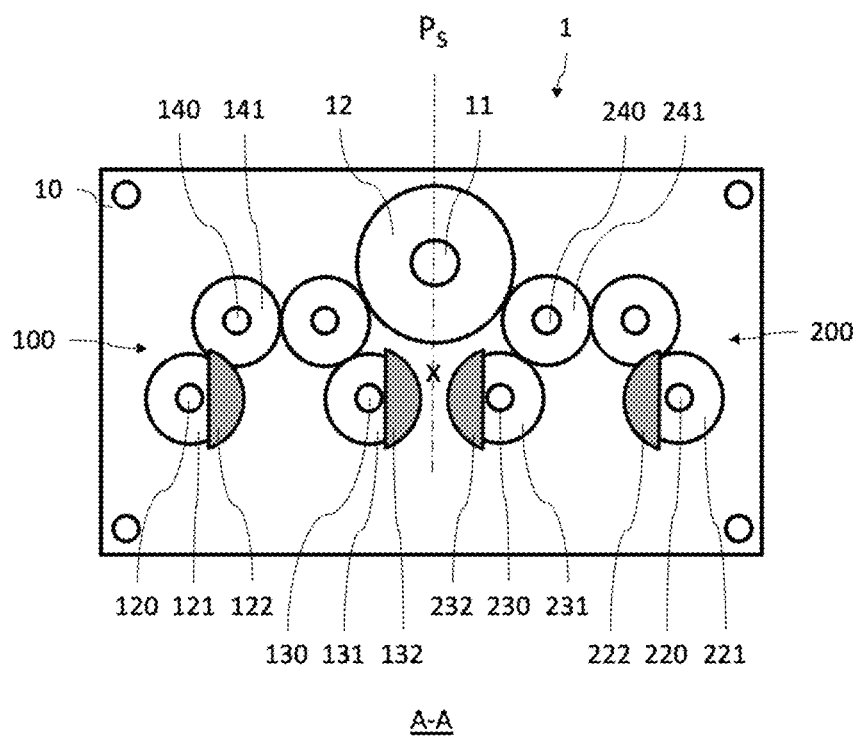
FIG. 2 is a sectional view of FIG. 1 illustrating the positioning of eccentric elements.
Figure 3:
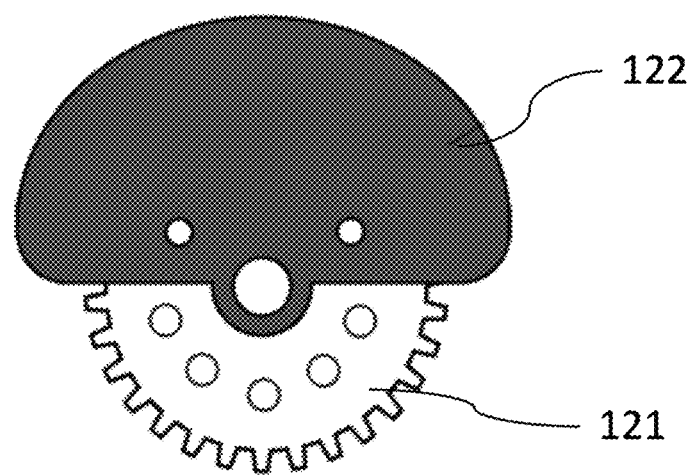
FIG. 3 shows a structural example of an eccentric element mounted on a toothed wheel.

In the example illustrated in FIG. 1 to 3, the frame 10 is parallelepipedal in shape and comprises two metal plates $10_A$, $10_B$ disposed facing one another and rigidly connected to one another, substantially at the four corners thereof, by tubing. Each plate $10_A$, $10_B$ has through-holes (not shown) intended in particular to allow for the passage of and to support the shafts of the mechanisms 100, 200, preferably by means of bearings (not shown), such as ball bearings. This in particular reduces friction and thus optimises the efficiency and durability of the system.

The main shaft 11 has a first end coupled to the rotary drive means 20 and a second end, opposite the first end, coupled to the energy harvesting device 30.

In this example, the drive means 20 and the energy harvesting device 30 are respectively an electric motor and an electric generator cooperating, via a coupling device 201, 301, such as a clutch, with the main shaft 11.

Such coupling devices 201, 301 allow, as required, the motor shaft 20 to be connected to/separated from the main shaft 11 and the rotor of the generator 30 to be connected to/separated from the main shaft 11 respectively so as to connect or disconnect the rotary drive. For example, when starting the system 1, the generator 30 could be disengaged from the main shaft 11 in order to more quickly reach a predetermined value of mechanical energy accumulated in the eccentric elements. Conversely, when this predetermined value is reached, or when the operation of the motor 20 is voluntarily or involuntarily shut down, the motor 20 could be disengaged from the main shaft 11 in order to optimise energy delivery.

Moreover, the system 1 comprises an electrical cable (not shown) connecting the output of the generator 30 to the input of the motor 20 so that, if required, all or part of the electrical energy generated can be fed therein. This can be particularly useful when the system 1 is in operation and when no consumer (electrical appliance) is connected to the generator 30 for a relatively short period of time. In such a situation, the "latent" electrical energy generated by the generator 30 is fed into the motor 20 so as to reduce the amount of external energy, originating from the power grid, required to ensure the system can operate. By not stopping the system 1 from operating, there is no need to restart it at a later time, which restart may require a considerable amount of time and external electrical energy, depending on the size of the system. Alternatively or additionally, the latent electrical energy can be stored in whole or in part in a battery to be delivered at a later time.

Furthermore, in the example shown, each first and second eccentric element 122, 132, 222, 232 substantially takes the shape of a half-cylinder (or half-disc), as shown in particular in FIG. 3.

Moreover, each first and second eccentric element, such as the first eccentric element 122 shown in FIG. 3, has a ring $122_1$ for connection to the associated support shaft 120.

Such a connecting ring ensures in particular that the eccentric element is held on the associated shaft. This minimises the risk of eccentric components becoming uncoupled from the system when in operation.

FIG. 3 also shows the presence of apertures made in the first eccentric element 122 and in the first toothed wheel 121 to allow fastening screws (not shown) to pass therethrough for the rigid connection thereof. It goes without saying that any other means for ensuring an effective, robust, rigid connection can be envisaged.

The transmission means of each mechanism 100, 200 comprise, in the example shown, two intermediate toothed wheels 141, 241, each carried by an intermediate shaft 140, 240 which is capable of rotating relative to the frame 10. The first intermediate toothed wheel 141, 241 is disposed between the main toothed wheel 12 and the second toothed wheel 131, 231 and is meshed with them. The second intermediate toothed wheel 141, 241 is disposed between the first intermediate toothed wheel 141, 241 and the first toothed wheel 121, 221 and is meshed with them. Such an arrangement of the transmission means allows for simple and robust synchronised counter-rotation of the first and second toothed wheels of each mechanism.

The first and second toothed wheels 121, 131, 221, 231 have the same diameter and the same number of teeth. The rotary motions of the first and second toothed wheels 121, 131, 221, 231 are thus uniform.

The functional aspects of a system as described hereinabove will now be described.

The operation of the system 1 can be divided into several steps, i.e. a start-up step, an energy harvesting step and, where necessary, during the energy harvesting step, restart steps.

The start-up step consists of using the motor 20 to drive the rotary motion of the first and second toothed wheels 121, 131, 221, 231 of the mechanisms 100, 200 and thus of the associated first and second eccentric elements 122, 132, 222, 232. This start-up step is carried out, for example, for a predetermined period of time or until a predetermined value of mechanical energy accumulated in the eccentric elements is reached.

During the energy harvesting step, the generator 30 coupled to the main shaft 11 of the system 1 harvests the mechanical energy accumulated in the eccentric elements and converts it into electrical energy.

The restart steps consist of giving new momentum to the first and second toothed wheels 121, 131, 221, 231. For example, the restart steps are carried out when the value of the mechanical energy accumulated in the eccentric elements is below a predetermined value.

When the system 1 is in operation, and regardless of the step described hereinabove, the positions of the eccentric elements of the mechanisms, with each quarter turn of the associated toothed wheels, correspond to the successive positions shown in FIG. 4A to 4D.

Figure 4A:
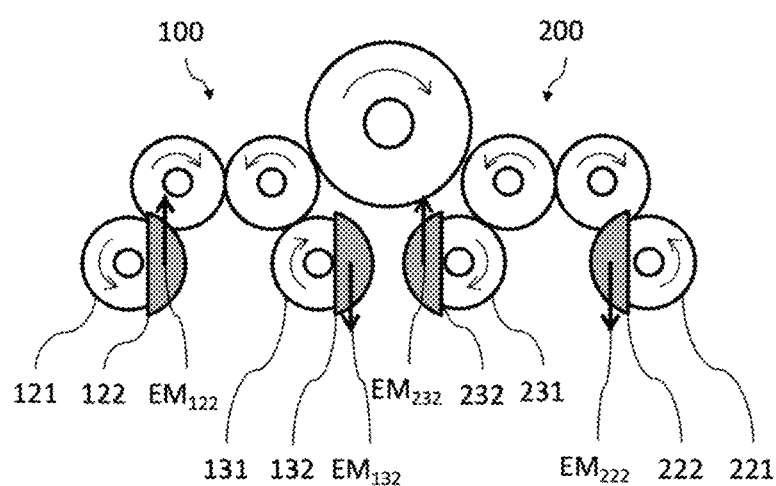
FIGS. 4A, 4B, 4C and 4D illustrate different simplified views of the rotary motions of the eccentric elements of the system shown in FIG. 1 when in operation.

In the initial positions, as shown in FIG. 4A, the first and second eccentric elements 122, 132 of the first mechanism 100 are oriented to the right and the first and second eccentric elements 222, 232 of the second mechanism 200 are oriented to the left.

Figure 4B:
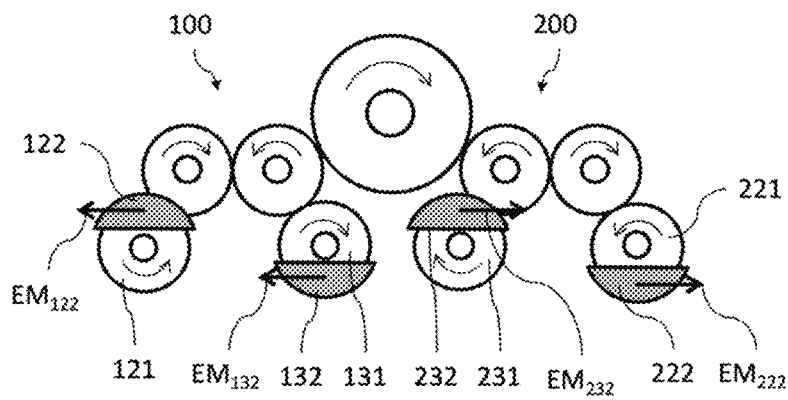

After a first quarter turn of the first and second toothed wheels 121, 131, 221, 231, as shown in FIG. 4B, the first eccentric element 122 of the first mechanism 100 and the second eccentric element 232 of the second mechanism 200 are oriented upwards, whereas the second eccentric element 132 of the first mechanism 100 and the first eccentric element 222 of the second mechanism 200 are oriented downwards.

Figure 4C:
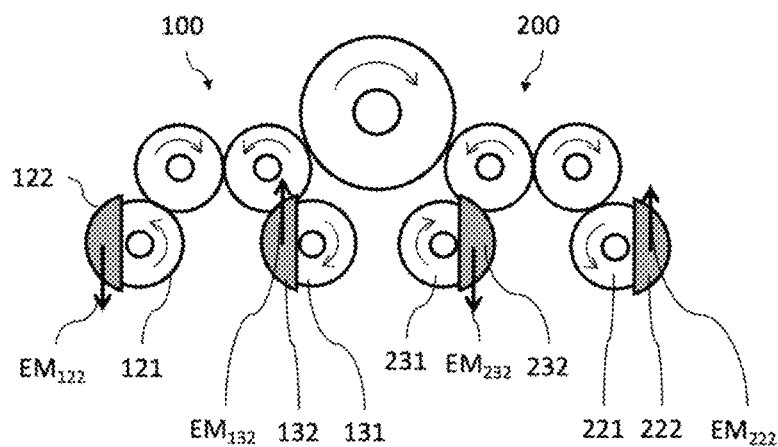

After a second quarter turn, as shown in FIG. 4C, the first and second eccentric elements 122, 132 of the first mechanism 100 are oriented to the left and the first and second eccentric elements 222, 232 of the first mechanism 200 are oriented to the right.

Figure 4D:
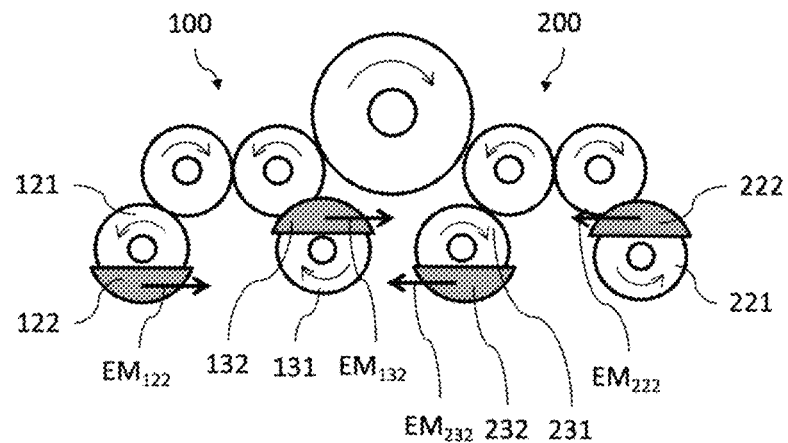

After a third quarter turn, shown in FIG. 4D, the first eccentric element 122 of the first mechanism 100 and the second eccentric element 232 of the second mechanism 200 are oriented downwards, whereas the second eccentric element 132 of the first mechanism 100 and the first eccentric element 222 of the second mechanism 200 are oriented upwards.

Thus, the synchronised counter-rotations of the first and second toothed wheels 121, 131, 221, 231 of each mechanism 100, 200 allow the first and second eccentric elements 122, 222 of the first mechanism 100 to be constantly in positions diametrically opposed to the positions of the second and first eccentric elements 232, 132 of the second mechanism 200 respectively.

From an energy viewpoint, this results in:
a mechanical energy $EM_{122}$, i.e. the sum of the kinetic and potential energies, accumulated in the first eccentric element 122 of the first mechanism 100, that constantly has a direction opposite that of a mechanical energy $EM_{222}$ accumulated in the first eccentric element 222 of the second mechanism 200,
a mechanical energy $EM_{132}$, accumulated in the second eccentric element 132 of the first mechanism 100, that constantly has a direction opposite that of the mechanical energy $EM_{232}$ accumulated in the second eccentric element 232 of the second mechanism 200, and
identical values of the mechanical energies $EM_{122}$, $EM_{132}$, $EM_{222}$, and $EM_{232}$.

These constant diametric oppositions allow the system 1 to be balanced, without the need for a rocker arm as in previous solutions.

This makes it possible to apply high rotary speeds to the first and second eccentric elements 122, 132, 222, 232, for example speeds in the order of 450 rpm or even 500 rpm. This results in a high level of accumulated mechanical energy and, ultimately, also in a high level of electrical energy generated.

FIGS. 5, 6A and 6B show an example of an energy accumulation and delivery system according to a second embodiment of the invention.

This second embodiment differs from the first essentially in the way the pair of mechanisms is assembled. More specifically, in this second embodiment, the mechanisms of the system are assembled in series. Such an assembly in particular allows the overall dimensions of the system to be reduced, by decreasing the length or the height thereof. This can allow the system to be easily installed in tight spaces, for example.

For the sake of brevity and clarity, the elements common to the first embodiment will not be described.

In this second embodiment, the frame 10' of the system 1' comprises two pairs of structures $10_A'$, $10_B'$, disposed opposite one another, each supporting one of the mechanisms 100', 200'.

The mechanisms 100', 200' are assembled in series in particular by means of the main shaft 11' supporting two identical main toothed wheels 12A', 12B' associated respectively with the first and second mechanisms 100', 200'. With the exception of the first and second eccentric elements 122', 132', 222', 232', such an assembly in series allows the system 1' to be symmetrical relative to a plane (not shown) passing substantially through the centre of the main shaft 11 and perpendicular to the main shafts 110', 210' in particular.

With such an arrangement, the first and second eccentric elements 122', 132' of the first mechanism 100' are disposed at least partially in a first plane of rotation $P_R$ and the first and second eccentric elements 222', 232' of the second mechanism 200' are disposed at least partially in a second plane of rotation $P_R'$. In other words, in accordance with the first aspect of the invention, the first and second eccentric elements 122', 132', 222', 232' of at least one of the mechanisms 100', 200' are disposed at least partially in a plane of rotation $P_R$, $P_R'$ perpendicular to the associated first and second support shafts 120', 130', 220', 230'.

When the system 1' is in operation, the two main toothed wheels 12A', 12B' are rotated in the same direction.

Coupling the second main toothed wheel 12B' to the second intermediate wheel of the transmission means allows the first and second eccentric elements 122', 132' of the first mechanism to be constantly in positions diametrically opposed to the positions of the first and second eccentric elements 222', 232' of the second mechanism 200 respectively.

From an energy viewpoint (not shown), this results in:
a mechanical energy, accumulated in the first eccentric element 122' of the first mechanism 100', that constantly has a direction opposite that of a mechanical energy accumulated in the second eccentric element 232' of the second mechanism 200',
a mechanical energy, accumulated in the second eccentric element 132' of the first mechanism 100, that constantly has a direction opposite that of the mechanical energy accumulated in the first eccentric element 222' of the second mechanism 200', and
identical values of mechanical energies.

In addition to reducing the overall dimensions, a system according to the second embodiment has similar advantages to those of a system according to the first embodiment of the invention.

FIG. 7A to 7D show a diagrammatic example of an energy accumulation and delivery system according to a third embodiment of the invention.

This third embodiment differs from the first, on the one hand, by the simplified intermediate transmission means between the main shaft and the support shafts and, on the other hand, by the orientation of the eccentric elements.

Simplifying such intermediate transmission means also leads to a simplified system structure, and thus lower manufacturing costs and easier system maintenance.

For the sake of brevity and clarity, the elements common to the first embodiment will not be described.

In this third embodiment, the main toothed wheel 12" is meshed, on the one hand, directly with the first and second toothed wheels 121", 131" of the first mechanism 100' and, on the other hand, via a single intermediate toothed wheel 141" to the first and second toothed wheels 221", 231" of the second mechanism 200". The first and second toothed wheels 121", 131" of the first mechanism 100" can thus rotate in opposite directions to the first and second toothed wheels 221", 231" of the second mechanism 200".

Similarly to the first embodiment, and in accordance with the first aspect of the invention, the first and second eccentric elements 122", 132", 222", 232" of the two mechanisms 100", 200" are disposed at least partially in the plane of rotation (not shown).

In this third embodiment, for each mechanism 100", 200", the first and second eccentric elements 122", 132", 222", 232" are oriented in opposite directions (for example one upwards and the other downwards).

Figure 7A:
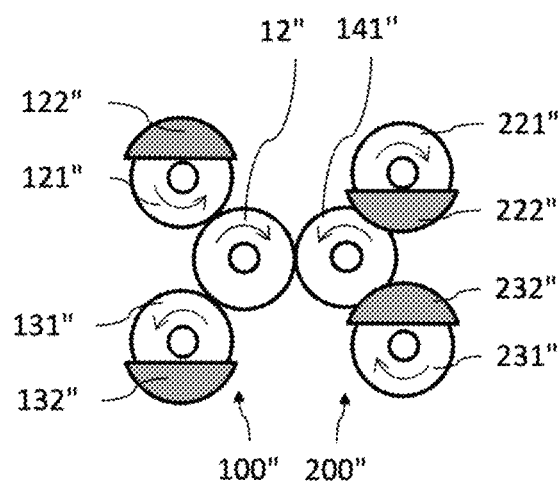
Figure 7B:
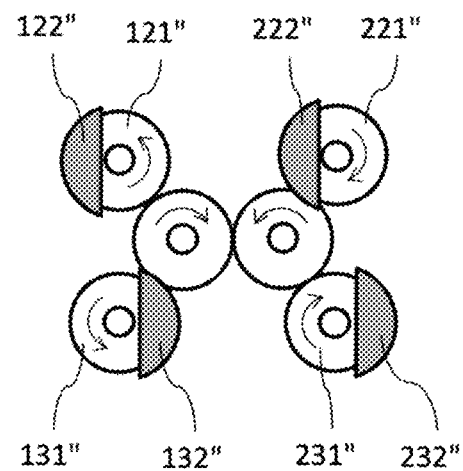
Figure 7C:
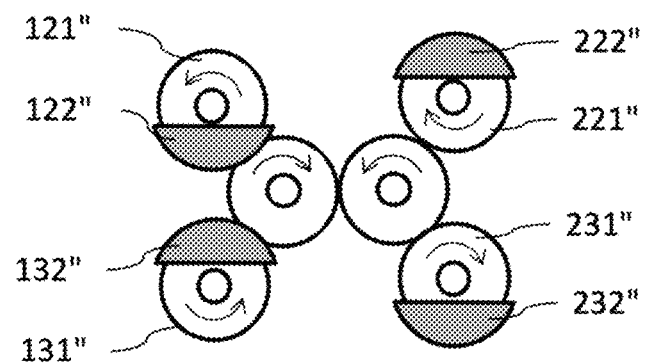
Figure 7D:
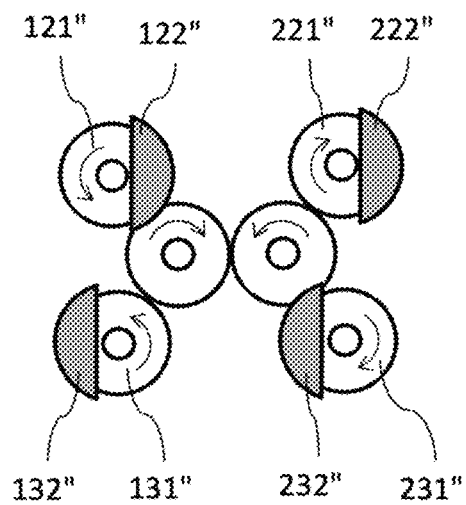
Figure 8A:
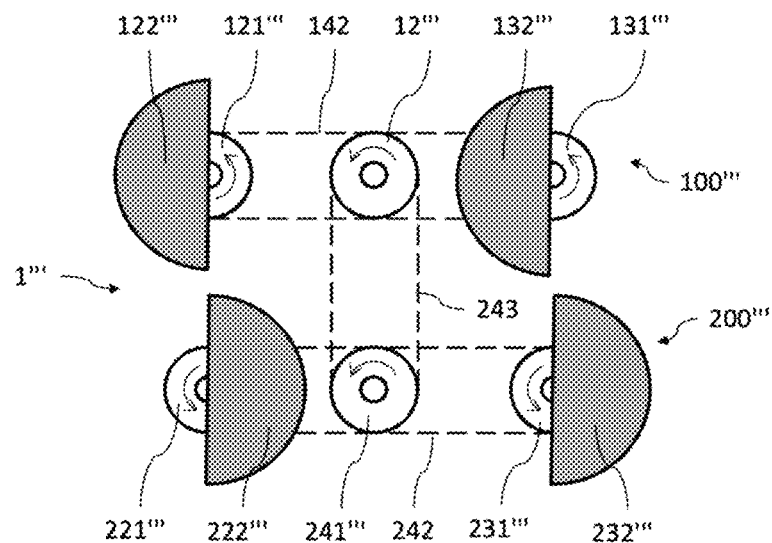
Figure 8B:
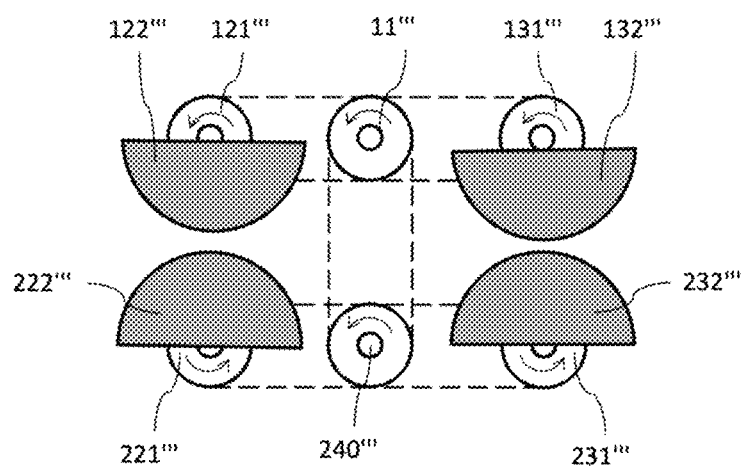
Figure 8C:
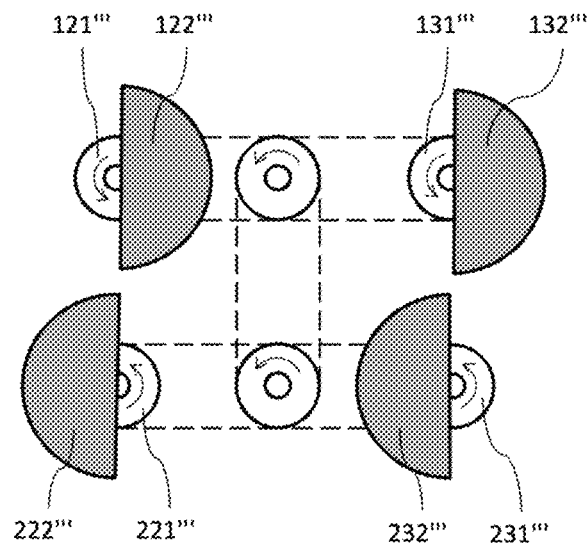
Figure 8D:
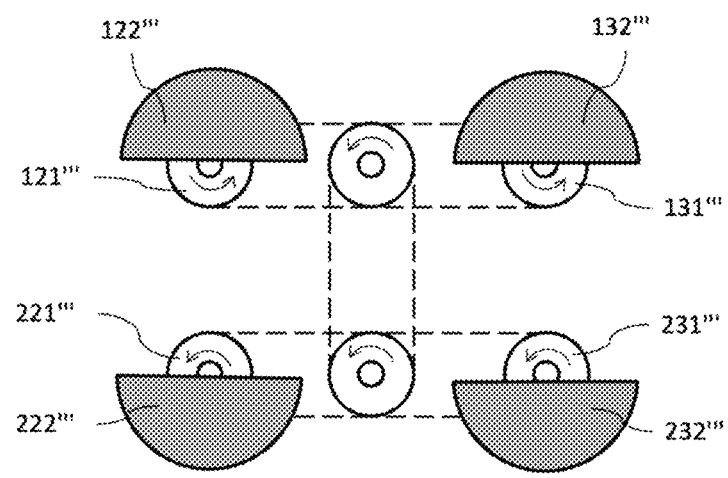

Thus, when the system 1" is in operation, with each quarter turn, the diametrical oppositions of the first and second eccentric elements 122", 132", 222", 232" alternate between:
a first configuration, shown in FIGS. 7A and 7C, wherein the position of the first eccentric element 122" of the first mechanism 100" is diametrically opposed to the position of the first eccentric element 222" of the second mechanism 200", whereas the position of the second eccentric element 132" of the first mechanism 100" is diametrically opposed to the position of the second eccentric element 232" of the second mechanism 200", and
a second configuration, shown in FIGS. 7B and 7D, wherein the position of the first eccentric element 122" of the first mechanism 100" is diametrically opposed to the position of the second eccentric element 232" of the second mechanism 200", whereas the position of the second eccentric element 132" of the first mechanism 100" is diametrically opposed to the position of the first eccentric element 222" of the second mechanism 200".

Such an alternation allows the first and second eccentric elements 122", 132" of the first mechanism 100" to be in positions that are constantly diametrically opposed to those of the first and second eccentric elements 222", 232" of the second mechanism 200, in accordance with the second aspect of the invention.

FIG. 8A to 8D show a diagrammatic example of an energy accumulation and delivery system according to a fourth embodiment of the invention.

This fourth embodiment differs from the first mainly by the nature of the intermediate transmission means between the main shaft and the support shafts of each mechanism.

Similarly to the first embodiment, and in accordance with the first aspect of the invention, the first and second eccentric elements 122''', 132''', 222''', 232''' of the mechanisms 100''', 200''' are disposed at least partially in the plane of rotation (not shown).

In this fourth embodiment, the system 1''' has a specific arrangement according to which:
the first and second eccentric elements 122''', 132''' of the first mechanism 100''' are oriented in a first common direction opposite a second common direction of the first and second eccentric elements 222''', 232''' of the second mechanism 200''',
the first and second eccentric elements 122''', 132''', 222''', 232''' of each mechanism 100''', 200''' can thus rotate in a synchronised manner, and
the first and second eccentric elements 122''', 132''' of the first mechanism 100''' can thus rotate in a synchronised manner in an opposite direction to the first and second eccentric elements 222''', 232''' of the second mechanism 200'''.

Thus, when the system 1''' is in operation, the first and second eccentric elements 122''', 132''' of the first mechanism 100''' are angularly offset so as to be constantly in diametrically opposed positions to the first and second eccentric elements 222''', 232''' of the second mechanism 200'''.

In the example shown, the intermediate transmission means are formed by three transmission chains 142, 242, 13 and intermediate toothed wheels.

More specifically, a first transmission chain 142 connects the first and second toothed wheels 121''', 131" of the first mechanism 100''' to the main toothed wheel 12'''. A second transmission chain 242 connects the first and second toothed wheels 221''', 231" of the second mechanism 200''' to a first intermediate toothed wheel 241'''. A third transmission chain 243 connects a second intermediate toothed wheel (not shown) supported by the main shaft 11''' to a third intermediate toothed wheel supported by the intermediate shaft 240'.

The use of such a transmission chain is a simple solution which, on the one hand, allows the first and second toothed wheels 121''', 131', 221''', 231''' to be spaced apart from the main toothed wheel 111''', 211' and, on the other hand, allows them to be driven in synchronised rotation.

Moreover, this type of spacing allows eccentric elements 122''', 132''', 222', 232''' of large dimensions to be implemented so as to increase the mechanical energy accumulated therein, and all the more so delivered thereby.

5.3 Other Aspects and Alternative Embodiments

The four embodiments described hereinabove refer directly or indirectly to systems that deliver, in the form of electrical energy, the mechanical energy accumulated in the eccentric elements.

However, the system of the invention is not limited to such an application.

For example, in an alternative to the first embodiment, the eccentric elements have different masses. As a result, when the system is in operation, the values of the mechanical energy accumulated in the eccentric elements differ. This leads to instability in the system and thus to the generation of oscillations. For example, when mounted on a suitable structure, such an oscillating system can form a mixer (in particular for paint) or a compacting device (in particular a rammer). It goes without saying that any other application able to make use of the oscillations generated by such a system can be envisaged.

Optionally, a generator can also be coupled to the main shaft so as to supply electrical energy to electrical devices associated with the mixer, for example light and/or sound indicators, or a control panel, etc.

In an alternative embodiment, which can be applied to the various embodiments described hereinabove, each eccentric element is made in one piece with the associated toothed wheel. For example, an inner portion of the toothed wheel, preferably substantially half as shown in FIG. 9, is removed by machining to obtain a partially hollowed toothed wheel. The solid inner portion of the toothed wheel forms the eccentric element.

Such a one-piece (integral) arrangement in particular reduces the overall dimensions of the eccentric element and ensures that it is held in place on the associated toothed wheel.

In another alternative embodiment, not shown, which can be applied to the various embodiments described hereinabove, each eccentric element is formed by a plurality of identical bodies configured to be rigidly connected to one another in a reversible manner. This in particular allows the system to be modulated, by adding or removing bodies, depending on the desired use.

For example, if the body is a half-disc weighing 10 kg and it has been determined that each eccentric element must, for a first use, have a total mass of 60 kg so that the mechanical energy accumulated therein can satisfy the expected energy requirements, six bodies will be stacked to form an eccentric element. Then, if for a second use, it is determined that each eccentric element must have a total mass of 100 kg, the user can adapt the system by adding four bodies to each eccentric element. The system can thus be modulated in situ rather than having to procure another system with eccentric elements, each formed by a half-cylinder weighing 100 kg.

According to another example, all or some of the eccentric elements can be formed by a different number of bodies so as to define an oscillating system. Furthermore, such a modularity means that the oscillations generated can be controlled, thereby guaranteeing the integrity of the system and its environment.

The proposed technique is thus clearly not limited to the embodiments described hereinabove, which are provided by way of example only. It encompasses various modifications, alternative forms and other alternative embodiments that a person skilled in the art could envisage within the scope of this invention and in particular any possible combinations of the various embodiments described hereinabove, which can be taken separately or in combination.

According to various aspects, the proposed technique thus has some or all of the following advantages, depending on the embodiments chosen:

- it proposes a versatile system;
- it simplifies the structure of the system;
- it proposes an efficient system for accumulating and delivering mechanical energy;
- it proposes an oscillating system;
- it guarantees a highly durable system;
- it guarantees simplified system maintenance and/or assembly;
- it guarantees the safety of the system and its environment;
- it limits the manufacturing costs of the system;
- it limits the overall dimensions of the system;
- it proposes a modular system;
- etc.

The invention claimed is:

1. A system comprising a frame supporting:
    at least one pair of mechanisms, each comprising:
    a first support shaft, capable of moving in rotation about an axis, equipped with a first toothed wheel and with a first element that is relative to the axis of said first support shaft, and
    a second support shaft, capable of moving in rotation about an axis, equipped with a second toothed wheel and with a second element that is relative to the axis of said second support shaft,
    a main shaft capable of moving in rotation about an axis, equipped with at least a main toothed wheel cooperating with said first and second toothed wheels so as to link the rotation of the main shaft with the rotation of the first and second support shafts of said mechanisms, and vice-versa, and
    a rotation driving means coupled to said main shaft so as to rotate said main shaft,
    wherein said system further comprises at least one intermediate toothed wheel carried by an intermediate shaft, disposed between said main toothed wheel and said first and second toothed wheels so as to link the rotation of the main shaft to the rotation of the support shafts, and vice-versa,
    wherein said first and second elements of at least one of said mechanisms are disposed at least partially in a plane of rotation perpendicular to said associated first and second support shafts, and
    wherein, when said system is in operation, positions of said first and second elements of one of said mechanisms are constantly diametrically opposed to positions of said first and second elements of the other mechanism.

2. The system according to claim 1, wherein each of said first and second elements is formed by at least one body having a ring for connection to said associated support shaft.

3. The system according to claim 1, wherein said first and second elements are rigidly connected to said first and second toothed wheels respectively.

4. The system according to claim 1, wherein said first and second elements and said first and second toothed wheels respectively are made in one piece.

5. The system according to claim 1, wherein each first and second element takes the shape of a portion of a cylinder or the shape of a half-cylinder.

6. The system according to claim 1, further comprising at least one coupling device, said coupling device connecting said driving means to said main shaft.

7. The system according to claim 1, wherein said first and second elements of said mechanisms have the same mass and the same dimensions, and wherein said system further comprises at least one energy harvesting device coupled to said main shaft of one of said mechanisms, said energy harvesting device being configured to convert mechanical energy accumulated in said elements into electrical energy.

8. The system according to claim 1, wherein said first and second elements of said mechanisms have different masses.

* * * * *